July 8, 1952     P. C. MALMSTEN     2,602,679
SEAL FOR STOKER BEARINGS
Filed July 8, 1946
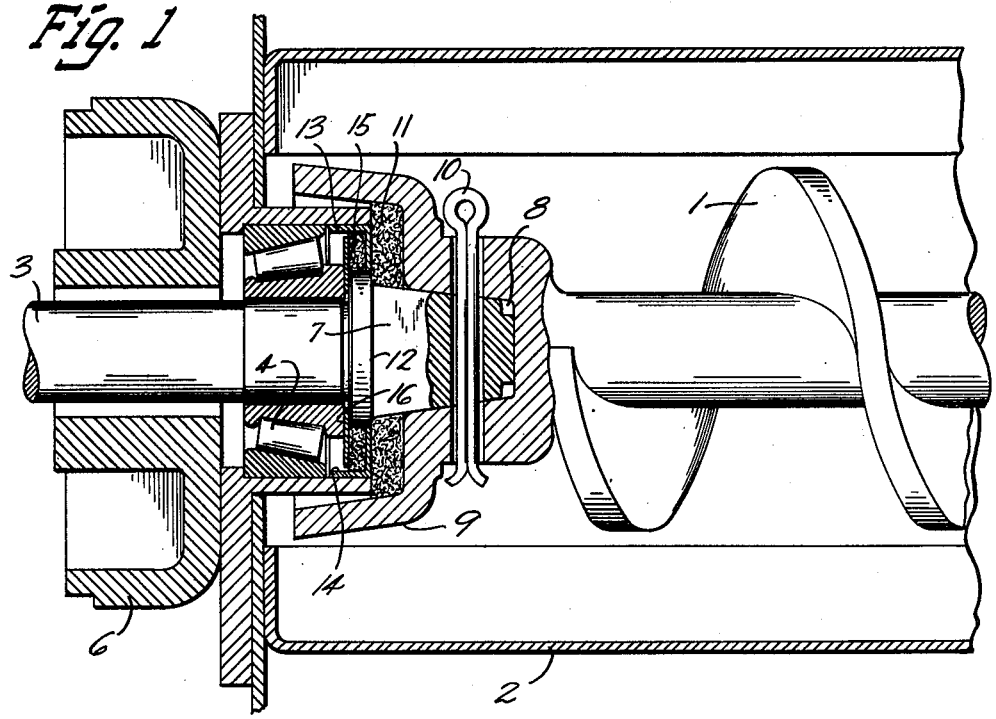
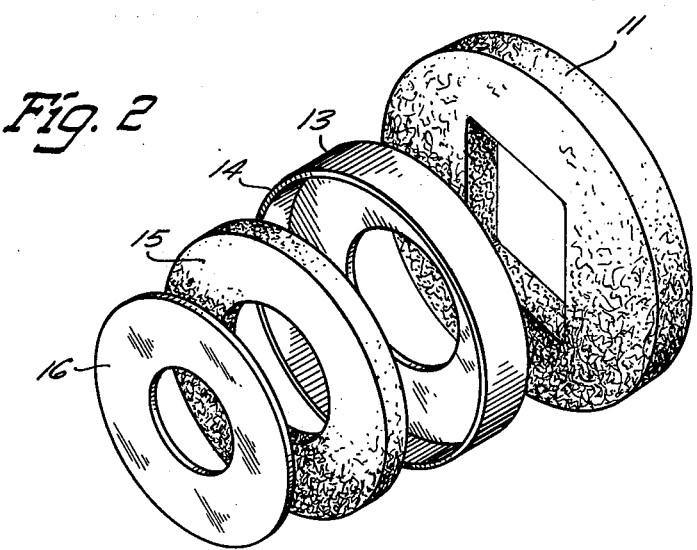
INVENTOR.
Philip C. Malmsten
BY
Attorney Patented July 8, 1952

2,602,679

UNITED STATES PATENT OFFICE 2,602,679

SEAL FOR STOKER BEARINGS

Philip C. Malmsten, Milwaukee, Wis., assignor to A. O. Smith Corporation, Milwaukee, Wis., a corporation of New York Application July 8, 1946, Serial No. 681,979

1 Claim. (Cl. 286—5)

This invention relates to a seal for stoker bearings and particularly has reference to the seal between the feed screw and clutch drive shaft to prevent coal dust from accumulating in the bearings in which the clutch shaft operates.

The principal object of the invention is to seal off the bearings in which the clutch shaft of a stoker operates against approach of dust to the bearings.

Another object is to seal off the clutch shaft bearings against dust by a seal which will not deteriorate in service.

These and other objects of the invention will appear hereinafter in connection with the following description of an embodiment of the invention as illustrated in the accompanying drawings.

In the drawings:

Figure 1 is a longitudinal sectional view of a portion of a stoker showing the seal of the invention between the clutch drive shaft and the stoker feed screw; and Fig. 2 is an exploded perspective, with the parts separated to more clearly show the several parts of the seal.

The drawing shows a portion of a stoker comprising in general the feed screw 1 which is rotated within the feed screw tube 2 by the clutch drive shaft 3, interlocked therewith, as will be described, and in turn driven by a motor and clutch assembly, not shown.

The clutch drive shaft 3 rotates within the bearing 4 which is suitably secured within the bearing housing 5. The rear portion of the clutch shaft rotates within the clutch housing 6, which is shown only in part with the clutch removed, and the forward end or head 7 seats within the opening 8 of the socket 9 provided at the rear end of feed screw 1.

The end 7 of clutch shaft 3 is square and the opening 8 of socket 9 is complementary thereto to provide the interlocking connection between the shaft and the feed screw by which the latter is rotated. The lock pin or bar 10 is transversely disposed in aligned apertures of feed screw 1 and shaft 3 at the interlock therebetween in socket 9 to couple the two members axially together and prevent separation thereof by forward axial movement of the feed screw in operation.

Socket 9 is of generally conical shape and overlaps bearing housing 5 for a substantial distance.

The seal provided to protect bearing 4 from dust and the like comprises a felt washer or packing 11 which is assembled around head 7 of shaft 3 and seats within the bottom of socket 9. The packing seats in the bottom of the socket at the forward side and is held in place by flange 12 of shaft 3 and the end of bearing housing 5. The washer 11 closes the forward end of bearing housing 5. The periphery of the washer extends radially beyond housing 5 in its seat within socket 9.

The cup shaped generally thin metal washer 13 encircles flange 12 of shaft 3. The base of washer 13 is faced toward washer 11 and the flange 14 thereof extends axially inwardly of bearing housing 5 to bearing 4 and underlaps the housing wall. The wall of the housing and washer flange 14 provide a metal to metal seal therebetween.

The felt washer or packing 15 which is of substantially less diameter than washer 11 encircles flange 12 of shaft 3 and seats within cup washer 13.

The seal is completed by the generally thin metal washer 16 which seats within cup washer 13 against felt washer 15. Washer 16, as with washer 15, is assembled around shaft 3 between bearing 4, and flange 12 of shaft 3 to secure the same in place and extends radially to flange 14 of cup washer 13. The bearing 4 is assembled on shaft 3 around the flange 17 thereon.

In order for dust to reach bearing 4 it would have to pass into the conical space between socket 9 and bearing housing 5, then between felt washer 11 and the inner end of housing 5. From there the dust would have to travel between felt washer 11 and cup washer 13 down to flange 12 of shaft 3 and then outwardly between felt washer 15 and cup washer 13 and past the outer peripheries of both felt washer 15 and the metal washer 16.

The felt washers 11 and 15 which are in tight engagement with shaft 3 prevent any axial movement of dust along the shaft to bearing 4 and the dust would also be restricted in such movement by cup washer 13 and metal washer 15.

The felt washers may be replaced by washers of any suitable absorbent material which would tend to pick up and retain dust.

The invention is particularly applicable to a stoker bearing in which the protection of the bearing from dust is especially important due to the extensive movement of coal dust in the area of the bearing when the stoker feed screw is in operation. The double seal provided insures that no dust will reach the bearing.

Various embodiments of the invention may be employed within the scope of the accompanying claim.

I claim:

In a driving connection for a stoker, a drive shaft, a stoker worm having a conical socket disposed at one end thereof and being interlocked with said shaft to rotate therewith, a cylindrical bearing housing open at the end facing said worm and shaft interlock and containing a bearing for said shaft, and a seal between the open end of said bearing housing and the rotating shaft and worm to prevent egress of oil from said bearing and ingress of coal dust to said bearing, said seal comprising a frusto conical skirt on the end of said worm and extending axially over the bearing housing for a substantial distance from the open end thereof and providing a cup shaped recess for receiving the open end of the bearing housing, a fixed washer secured in the open end of the bearing housing by an oil tight fit therewith and extending radially inward to an inner edge of the washer adjacent to the shaft, a second washer secured upon the shaft to rotate therewith inwardly of said stationary washer, said stationary washer having an inwardly extending flange at its outer circumference extending along the inner wall of said bearing housing beyond the outer edge of said rotary washer to prevent oil thrown centrifugally by said rotary washer from forcing itself into the fit between said flange and the bearing housing, a felt washer confined under axial pressure in the recess between said rotary worm and said stationary washer, and a felt washer confined under axial pressure between said stationary washer and said rotary washer, whereby coal dust tending to pass into said recess is substantially prevented from reaching the bearing by reason of the substantial radial extent of travel thereof required along the frictional end surfaces of the felts in series to pass the seal.

PHILIP C. MALMSTEN.

REFERENCES CITED

The following references are of record in the file of this patent:

UNITED STATES PATENTS

| Number | Name | Date |
| --- | --- | --- |
| 1,066,276 | Hockensmith | July 1, 1913 |
| 1,569,751 | Higgins | Jan. 12, 1926 |
| 1,760,356 | Harper | May 27, 1930 |
| 1,917,674 | Weaver | July 11, 1933 |
| 2,054,581 | Delaval-Crow | Sept. 15, 1936 |
| 2,080,669 | Nelson | May 18, 1937 |
| 2,100,113 | Travis | Nov. 23, 1937 |
| 2,122,085 | Castricone | June 28, 1938 |
| 2,251,450 | Hanna | Aug. 5, 1941 |
| 2,441,294 | Shafer | May 11, 1948 |